United States Patent [19]

Yeh

[11] Patent Number: 4,501,470
[45] Date of Patent: Feb. 26, 1985

[54] CHRISTIANSEN-BRAGG OPTICAL FILTER

[75] Inventor: Pochi A. Yeh, Thousand Oaks, Calif.

[73] Assignee: Rockwell International Corporation, El Segundo, Calif.

[21] Appl. No.: 306,115

[22] Filed: Sep. 28, 1981

[51] Int. Cl.³ .............. G02B 27/00; G02B 5/20; G02B 5/22

[52] U.S. Cl. .................. 350/313; 350/1.6; 350/166; 350/311

[58] Field of Search ............. 350/166, 311, 313, 1.6

[56] References Cited

U.S. PATENT DOCUMENTS 4,240,696 12/1980 Tracy et al. .................. 350/1.6
4,247,166 1/1981 Yeh .
4,269,481 5/1981 Yeh et al. .

FOREIGN PATENT DOCUMENTS 2027925 2/1980 United Kingdom .............. 350/314

OTHER PUBLICATIONS

Clarke, A Theory for the Christiansen Filter, 7 Appl. Optics 861 (1968).
Lerner, Limitations in the Use of Dielectric Interference Filters in Wide Angle Optical Receivers, 10 Appl. Optics 1914 (1971).
Yariv, Guided-Wave Optics, Scientific American, Jan., 1979, pp. 64-72.
Yeh et al., Electromagnetic Propagation in Periodic Stratified Media, 67 J. Opt. Soc. Am. 423 (1977).

Primary Examiner—Bruce Y. Arnold
Assistant Examiner—William Propp
Attorney, Agent, or Firm—H. Fredrick Hamann; Craig O. Malin; John J. Deinken

[57] ABSTRACT

Disclosed is an optical bandpass filter for transmitting light in a narrow band around the wavelength $\lambda_c$, including a first series of layers, each of thickness t, having a refractive index $n_1$ and a second series of layers, each of thickness t, having a refractive index $n_2$ and alternating with the first series. The thickness t is selected so that $t = \lambda_c / 4 n_c$ and $|\Delta| > \pi |D - 1/\lambda_c|$, where $$\Delta = \frac{1}{n_c} \left[ \frac{d}{d\lambda} (n_2 - n_1) \right]_{\lambda_c}$$

$$D = \frac{1}{2n_c} \left[ \frac{d}{d\lambda} (n_2 + n_1) \right]_{\lambda_c}$$

and $n_c$ is the common value of $n_1$ and $n_2$ at the wavelength $\lambda_c$. Also disclosed is a filter with each succeeding layer in the first and second series thicker than the preceding layer. The thickness of the thinnest layer is $\lambda_1 / 4n$ and the thickness of the thickest layer is $\lambda_2 / 4n \cos \theta$, where $\lambda_1$ is the minimum wavelength to be reflected by the filter, $\lambda_2$ is the maximum wavelength, $n = (n_1 + n_2)/2$, and $\theta$ is the internal angle corresponding to $\theta_o$, i.e., $\sin \theta_o = n \sin \theta$.

6 Claims, 4 Drawing Figures

CHRISTIANSEN-BRAGG OPTICAL FILTER

BACKGROUND OF THE INVENTION

This invention relates to the field of wide angle narrowband optical filters.

Spectral filters are employed for selecting a portion of the spectral content of an incoming broadband optical signal. Many optical systems require a spectral filter having a very narrow spectral passband width but a very large acceptance angle for incident light. A narrowband optical filter is an essential element, for example, in many laser communications systems to reject unwanted background light and thereby increase the signal-to-noise ratio. In addition, the signal in such systems may be transmitted through a random medium, such as the earth's atmosphere or sea water, in such a way that what must be observed is a scattered component of the signal. The signal may thus appear to come from a wide field of view of up to several steradians. A particular example of such circumstances may be found in submarine communications systems, where a filter with a bandwidth of less than 1 Å and an acceptance angle of at least ±30° is required.

Unfortunately, in the spectral filters known in the art, a narrow bandpass width is invariably accompanied by a narrow angular aperture. The angular aperture of a narrowband dielectric interference filter, for example, is limited by the relationship $$\theta^2 = 2N_{eff}^2(\Delta\lambda/\lambda), \quad (1)$$

where $\theta$ is the acceptance cone angle, $(\Delta\lambda/\lambda)$ is the fractional bandwidth, and the quantity $N_{eff}$ is the effective index of refraction of the interference filter. As can be seen from Equation 1, a dielectric interference filter with a fractional bandwidth $\Delta\lambda/\lambda$ of $10^{-4}$ and an effective index $N_{eff}$ of 2.0 will be limited to an angular aperture $\theta$ of approximately 1.5°. This same relationship between the angular aperture and the fractional bandwidth also holds for polarization interference filters, such as Solc filters and Lyot-Ohman filters. Some improvement in the angular aperture of the Lyot-Ohman filter can be obtained by replacing the birefringent plates with more complicated birefringent plate combinations, raising the angular aperture for a quartz Lyot filter with a fractional bandwidth of $10^{-4}$ to approximately 16°. Unfortunately, however, polarization interference filters are disadvantaged because an inherent signal loss of 50% occurs in the front polarizer of such a filter.

As a consequence of these limitations in the prior art, a need has developed for a low loss spectral filter which will exhibit a very narrow bandwidth and a wide angular aperture.

SUMMARY OF THE INVENTION

It is a general objective of this invention to provide a new optical filter.

An optical bandpass filter for transmitting light in a narrow band around the wavelength $\lambda_c$ includes, according to the present invention, a first series of layers having a refractive index $n_1$ and a second series of layers having a refractive index $n_2$, with the second series layers alternating with the first series. The refractive indices $n_1$ and $n_2$ are selected to have a common value $n_c$ at the wavelength $\lambda_c$.

In a more particular embodiment, the filter includes a first series of layers of thickness t having a refractive index $n_1$ and a second series of layers of thickness t having a refractive index $n_2$ such that $t = \lambda_c/4n_c$ and $|\Delta| > \pi|D - 1/\lambda_c|$, where $$\Delta = \frac{1}{n_c}\left[\frac{d}{d\lambda}(n_2 - n_1)\right]_{\lambda_c}$$

$$D = \frac{1}{2n_c}\left[\frac{d}{d\lambda}(n_2 + n_1)\right]_{\lambda_c}$$

and $n_c$ is the common value of $n_1$ and $n_2$ at the wavelength $\lambda_c$.

Another embodiment of the filter includes a first series of layers having a refractive index $n_1$ such that each succeeding layer is thicker than the preceding layer. A second series of layers having a refractive index $n_2$ is also arranged with each succeeding layer thicker than the preceding layer and with the layers of the second series alternating with the layers of the first series. $n_1$ and $n_2$ have a common value $n_c$ at the wavelength $\lambda_c$. The first and second layer series may further include m layers of thickness $t_i$ ($i = 1, 2, 3, \ldots m$) such that $t_1 = \lambda_1/4n$ and $t_m = \lambda_2/4n \cos\theta$, where $\lambda_1$ is the minimum wavelength to be reflected by the filter, $\lambda_2$ is the maximum wavelength to be reflected by the filter, $n = n_1 + n_2/2$, and $\theta$ is the internal angle corresponding to $\theta_o$, i.e., $\sin\theta_o = n \sin\theta$.

The invention also includes a method of making an optical bandpass filter for transmitting light in a narrow band around the wavelength $\lambda_c$, the method including the steps of selecting a first material having a refractive index $n_1$ and a second material having a refractive index $n_2$ such that $n_1$ is not equal to $n_2$ except at the wavelength $\lambda_c$. A layer of the first material is placed adjacent to a layer of the second material, and this step is repeated a plurality of times to form a first series of layers having the refractive index $n_1$ alternating with a second series of layers having the refractive index $n_2$.

These examples summarize some of the more important features of this invention. There are, of course, additional details involved in the invention, which are further described below and which are included within the subject matter of the appended claims.

BRIEF DESCRIPTION OF THE DRAWINGS

Additional objectives, features, and advantages of the present invention will be evident from the description below of the preferred embodiments and the accompanying drawings, wherein the same numerals are used to refer to like elements throughout all the figures. In the drawings.

DESCRIPTION OF THE PREFERRED EMBODIMENTS

This invention involves a new optical filter which combines the Christiansen filter and Bragg reflection to achieve a filter with a very narrow bandwidth and a wide angular aperture. The filter originally described by Christiansen contains a liquid in which small particles of a transparent optical material are suspended. The liquid and the particles are chosen so that the rate of change with wavelength (the dispersion) of the refractive index for the particles is different from that of the liquid and so that the refractive indices of the liquid and the particles are equal at a particular wavelength $\lambda_c$. The suspension will then be optically homogeneous to radiation at the wavelength $\lambda_c$, but at all other wavelengths scattering will occur, thereby reducing the transmission of the suspension. Because of the diffuse character of this scattering, the scattered radiation must be removed with an aperture in order to achieve an efficient filter with a high out-of-band reflection. Such an aperture, however, will limit the field-of-view of the filter.

Figure 1:
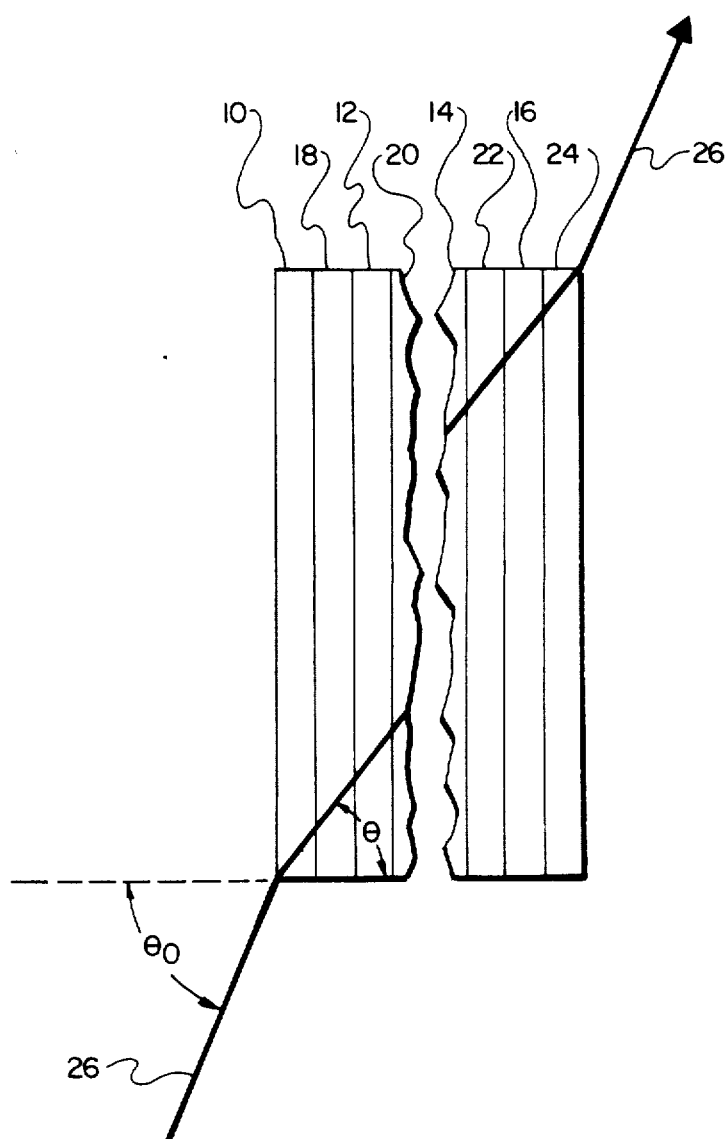
FIG. 1 is a cross sectional side view of a Christiansen-Bragg filter constructed in accordance with the present invention.

It is an outstanding feature of the present invention to provide a filter which incorporates the Christiansen filter concept in a design with an exceptionally wide field-of-view. FIG. 1 is a cross-sectional side view of a Christiansen-Bragg filter constructed in a accordance with the present invention. Although only a few layers are shown in the drawing, those skilled in the art will appreciate that a practical embodiment of the filter will contain a considerably larger number of layers than can be effectively illustrated. The filter includes the first series of layers 10, 12, 14, and 16 and a second series of layers 18, 20, 22, and 24. The layers 10–16 of the first series consist of a material having an index of refraction $n_1$, while the layers 18–24 have an index of refraction $n_2$. Furthermore, the materials are selected so that $n_1$ and $n_2$ are equal at the wavelength $\lambda_c$. Because of this relationship, the filter will appear optically homogeneous to light at the wavelength $\lambda_c$, as represented by the ray 26, and any such light which impinges on the filter at an angle within the angular aperture $\theta_o$ will thus be transmitted. Light at other wavelengths will be subjected to reflection from the interfaces between the layers. The operation of this filter can be further explained by considering first the properties of a generalized Bragg reflector.

Consider a periodically stratified medium which consists of N dielectric layers of refractive index $n_2$ equally spaced and immersed in a dielectric medium of refractive index $n_1$. This derivation will be limited to the case of light impinging on this structure at normal incidence, although the extension to a general angle of incidence can be found in Yeh, et al., Electromagnetic Propagation in Periodic Stratified Media, 67 J. Opt. Soc. Am. 423 (1977), the teaching of which is incorporated herein by reference. The transmission T of such a Bragg reflector is given by $$T = \left(1 + |C|^2 \frac{\sin^2 NK\Lambda}{\sin^2 K\Lambda}\right)^{-1}, \quad (2)$$

with $$|C|^2 = \frac{1}{4}\left(\frac{n_2}{n_1} - \frac{n_1}{n_2}\right)^2 \sin^2 \frac{2\pi}{\lambda} n_2 b, \quad (3)$$

$$K\Lambda = \cos^{-1}\left\{\cos \frac{2\pi}{\lambda} n_1 a \cos \frac{2\pi}{\lambda} n_2 b - \frac{1}{2}\left(\frac{n_2}{n_1} + \frac{n_1}{n_2}\right) \sin \frac{2\pi}{\lambda} n_1 a \sin \frac{2\pi}{\lambda} n_2 b\right\}, \quad (4)$$

where $\lambda$ is the wavelength of the radiation, b is the thickness of the layer with refractive index $n_2$, a is the thickness of the layer with refractive index $n_1$, $\Lambda = a + b$ and K is the Bloch wave number.

In the optical stop band, $K\Lambda$ is a complex number:

$$K\Lambda = m\pi + iK_i\Lambda, \quad (5)$$

where m is an integer and $K_i$ is the imaginary part of K.

The transmission formula of Equation 2 then becomes:

$$T = \left(1 + |C|^2 \frac{\sinh^2 NK_i\Lambda}{\sinh^2 K_i\Lambda}\right)^{-1} \quad (6)$$

For large N, the second term in the denominator will predominate and the transmission will approach zero exponentially as $\exp[-2(N-1)K_i\Lambda]$.

It follows that the band rejection approaches 100% for a Bragg reflector with a substantial number of layers. A Bragg reflector will exhibit optimized rejection, as indicated by Equations 4 and 6, when the layers are a quarter wave thick, i.e., when $a = \lambda/4n_1$, and $b = \lambda/4n_2$.

The rejection bandwidth will then reach its maximum value of $$\frac{\Delta\lambda}{\lambda} = \frac{4}{\pi} \sin^{-1}\left[\frac{n_2 - n_1}{n_2 + n_1}\right] \quad (7)$$

For a wavelength $\lambda_c$ where $n_1 = n_2$, the transmission will reach unity and this rejection band will disappear.

Consider now a Bragg reflector made of a stack of alternating quarter wave layers of two different materials. The dispersion curves of the chosen media intersect at wavelength $\lambda_c$, i.e., $n_1(\lambda_c) = n_2(\lambda_c) = n_c$, and the layer thicknesses are $a = b = \lambda_c/4n_c$. To obtain the transmission spectrum of this reflector in the spectral regions around $\lambda_c$, the limit of $(\lambda - \lambda_c)\Lambda/\lambda^2 << 1$ must be taken and the transcendental functions in Equations 3 and 4 expanded. After neglecting the higher order terms, this approach yields:

$$|C|^2 = \Delta^2(\lambda - \lambda_c)^2, \quad (8)$$

$$K\Lambda = \pi + i[\Delta^2 - \pi^2(D - 1/\lambda_c)^2]^{\frac{1}{2}}(\lambda - \lambda_c), \quad (9)$$

where $\Delta$ and D are constants and are given by $$\Delta = \frac{1}{n_c}\left[\frac{d}{d\lambda}(n_2 - n_1)\right]_{\lambda_c}, \quad (10)$$

$$D = \frac{1}{2n_c}\left[\frac{d}{d\lambda}(n_2 + n_1)\right]_{\lambda_c}. \tag{11}$$

From Equation 9 it can be seen that the optical band structure in the spectral regime around $\lambda_c$ depends on the sign of $[\Delta^2 - \pi^2(D - 1/\lambda_c)^2]$. The optical stop band will thus appear only when the difference in the dispersion is strong enough that $$|\Delta| > \pi|D - 1/\lambda_c| \tag{12}$$

Figure 2:
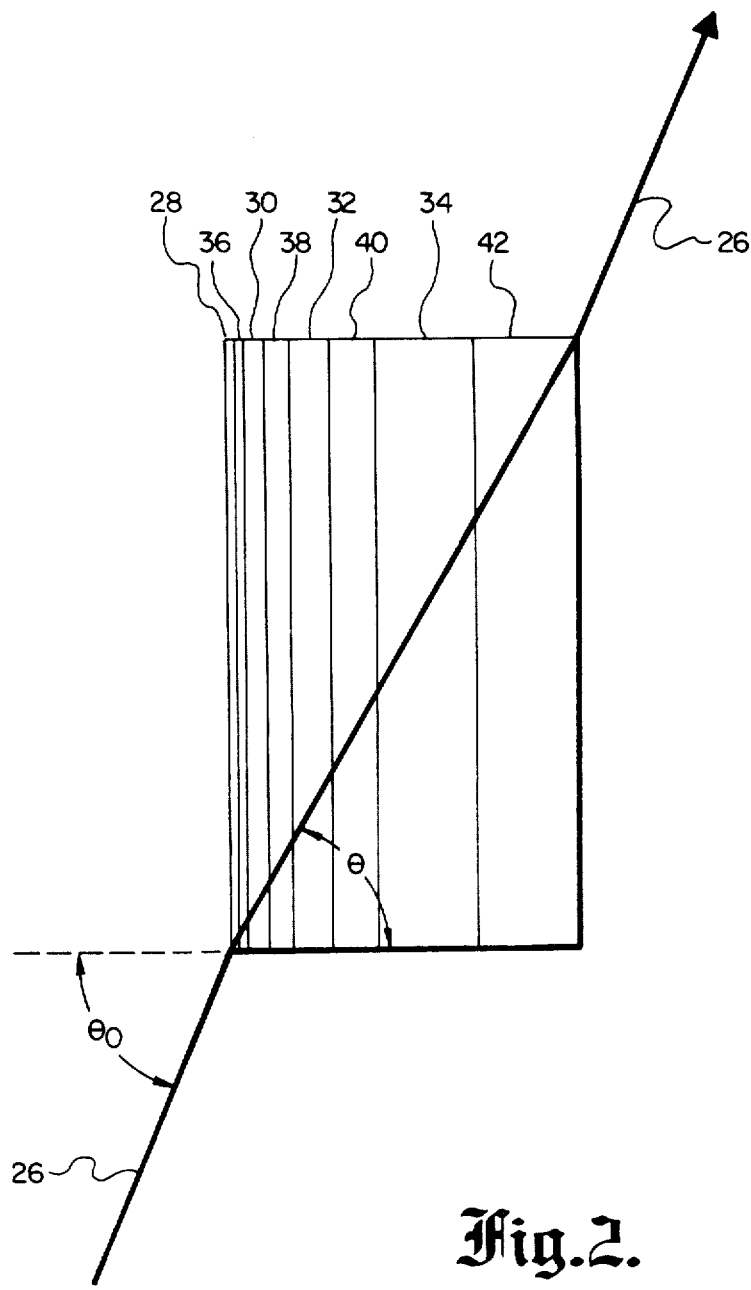
FIG. 2 is a cross sectional side view of a chirped Christiansen-Bragg filter.

Materials exhibiting anomalous dispersion may be used to satisfy this criteria. Thus, if such materials are used for the layers 10-24 in FIG. 1, an effective filter may be made with a uniform thickness of $\lambda_c/4n_c$ for each layer. The transmission profile of such a filter will include a single peak at $\lambda_c$ with a Lorentzian top, an exponentially decaying tail, and no side lobes around $\lambda_c$. The transmission bandwidth will decrease with increasing N and $\Delta^2$.

Where the relationship of Equation 12 is not satisfied, the transmission will consist of a main peak at $\lambda_c$ and a series of side peaks around $\lambda_c$ which will be spaced in inverse proportion to N because $K\Lambda$ in Equation 9 becomes a real number and the denominator in Equation 2 becomes a fast oscillating function of $\Lambda$. Consequently, a uniformly periodic quarter wave layered structure must satisfy the conditions of Equation 12 to operate as a narrowband filter. Where materials satisfying the conditions of Equation 12 are not available, the desired narrowband filter can nevertheless be achieved by "chirping" the layers, i.e., by gradually increasing or decreasing the layer thickness as shown in FIG. 2, which is a cross sectional side view of such a chirped Christensen-Bragg filter.

As with FIG. 1, those skilled in the art will appreciate that a practical embodiment of such a filter will include a much greater number of layers than can be effectively illustrated. This filter includes a first series of layers 28, 30, 32, and 34 arranged such that each succeeding layer is thicker than the preceding layer, and a second series of layers 36, 38, 40, and 42 which alternate with the layers of the first series and which are similarly arranged in order of increasing thickness. As in the filter of FIG. 1, the layers 28-34 have a refractive index $n_1$ and the layers 36-42 have a refractive index $n_2$ such that $n_1$ and $n_2$ have a common value $n_c$ at the wavelength $\lambda_c$.

A very uniform and high reflectance throughout a broad spectral regime can be obtained with the chirped design if the rate of variation in the layer thickness is small. The layer thickness, for example, might be varied according to a geometric progression, i.e., $t_{i+1} = kt_i$, where $t_i$ is the thickness of the ith layer and k is a constant close to 1. Light of different wavelengths will then be subjected to strong Bragg reflection at different portions of the filter structure, resulting in a broadband rejection of incident light by the filter. Moreover, this filter design inherently operates with a large angular aperture so that light from a wide range of directions will be rejected. Chirping the layer thickness of such a filter generally results in a broadening of the rejection bandwidth when the coupling constant K is independent of wavelength. In the case of the chirped Christiansen-Bragg filter, K vanishes at $\lambda_c$, causing a narrow passband at $\lambda_c$ and a broadband rejection for other wavelengths. Because this passband is due to the dispersion properties of the filter materials, the transmission characteristics of such a filter around $\lambda_c$ are very insensitive to the angle of incidence.

The coupled-mode equation is particularly suitable for analyzing the chirped Christiansen-Bragg filter, since the coupling is weak and, because $|n_2 - n_1| \gg n_1, n_2$, the variation of the field amplitudes is slow. It is assumed that the electromagnetic field can be represented by $$E(z) = A(z)e^{ikz} + B(z)e^{-ikz}, \tag{13}$$

where $A(z)$ and $B(z)$ are the complex amplitudes of the incident and reflected plane waves in the filter structure and k is the propagation constant defined as $k = (2\pi/\lambda)[(n_1^2 + n_2^2)/2]^{\frac{1}{2}}$. If Equation 13 is substituted into the Maxwell wave equation, the standard coupled-wave equations (see Yariv, 9 IEEE J. Quantum Electron. 919(1973), Kogelnik, Theory of Dielectric Waveguides, in Integrated Optics 15-27 (T. Tanir ed. 1976) are obtained after neglecting the nonsynchronous terms:

$$dA/dz = i\kappa B e^{-i2\Delta kz}, \tag{14}$$

$$dB/dz = -i\kappa^* A e^{i2\Delta kz}, \tag{15}$$

where $\kappa$ is the coupling coefficient and is given by $$\kappa = i2^{\frac{1}{2}}(n_2^2 - n_1^2)/\lambda(n_2^2 + n_1^2)^{\frac{1}{2}}, \tag{16}$$

and the phase mismatch factor $\Delta k$ is defined as $$\Delta k = k - \pi/\Lambda, \tag{17}$$

where $\Lambda$ is the period of the layered structure. In the case of a chirped layered structure $\Delta k$ is also a function of z because $\Lambda$ varies as a function of z. Numerical techniques can be used to solve the coupled mode equations 14 and 15.

An exact calculation can also be made for the layered structure by using the standard $2 \times 2$ matrix method (see Yeh, supra at 423) for both the s-wave and the p-wave at an arbitrary angle of incidence. The matrix method requires matrix algebra only and is relatively easier to accomplish than the coupled wave approach, especially for oblique angles of incidence.

Figure 3:
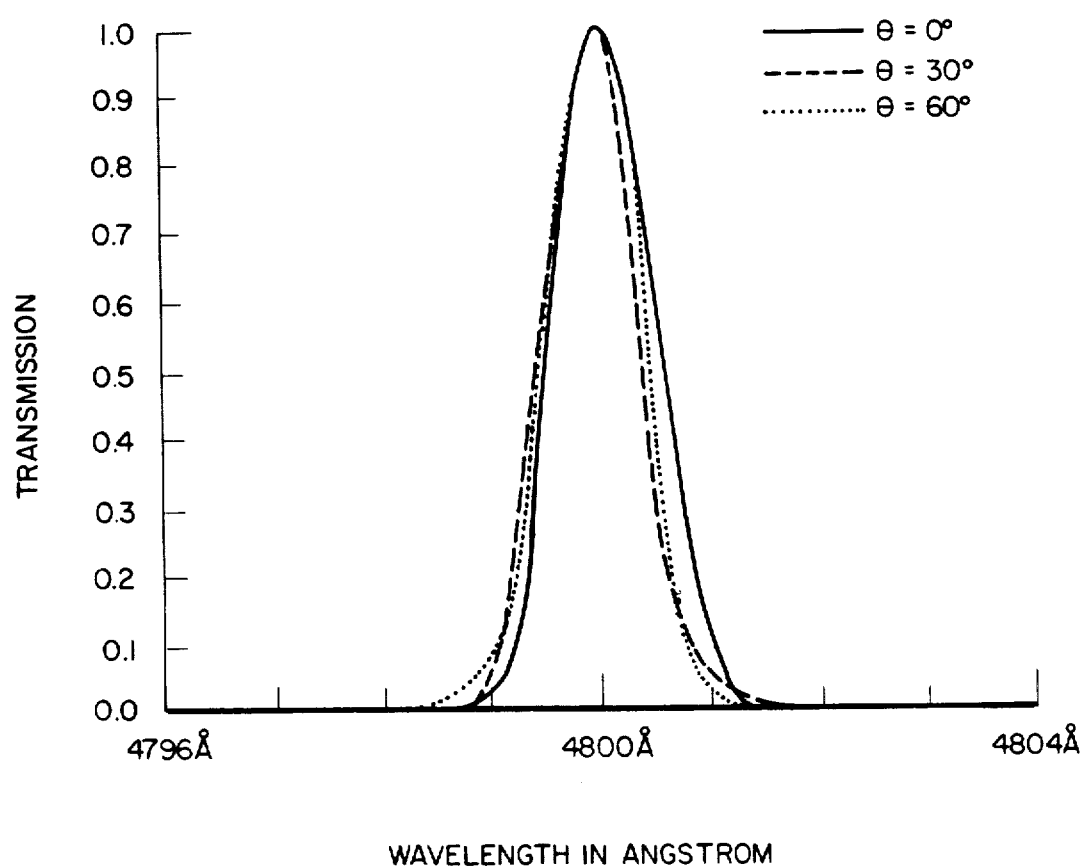
FIG. 3 is a plot of a theoretical transmission spectrum for a typical Christiansen-Bragg filter at three different angles of incidence.

In designing a chirped Christiansen-Bragg filter, the desired angular aperture $\theta_o$ and the free spectral range $(\lambda_1, \lambda_2)$ around $\lambda_c$, i.e., the range of wavelengths over which the filter is to provide a stop band, must be specified. The thickness of the filter layers must then be slowly varied from $\lambda_1/4n$ to $\lambda_2/4n \cos \theta$, where $\theta$ is the internal ray angle in the filter and n is the average index of refraction $(n = (n_1 + n_2)/2)$. A theoretical transmission spectrum for a typical Christiansen-Bragg filter at three different angles of incidence is illustrated in FIG. 3. Note that the spectral transmission peak as well as the bandwidth are both insensitive to the angle of incidence. The bandwidth will generally decrease as the number of layers increases or as the difference between the dispersion of the two materials increases.

Figure 4:
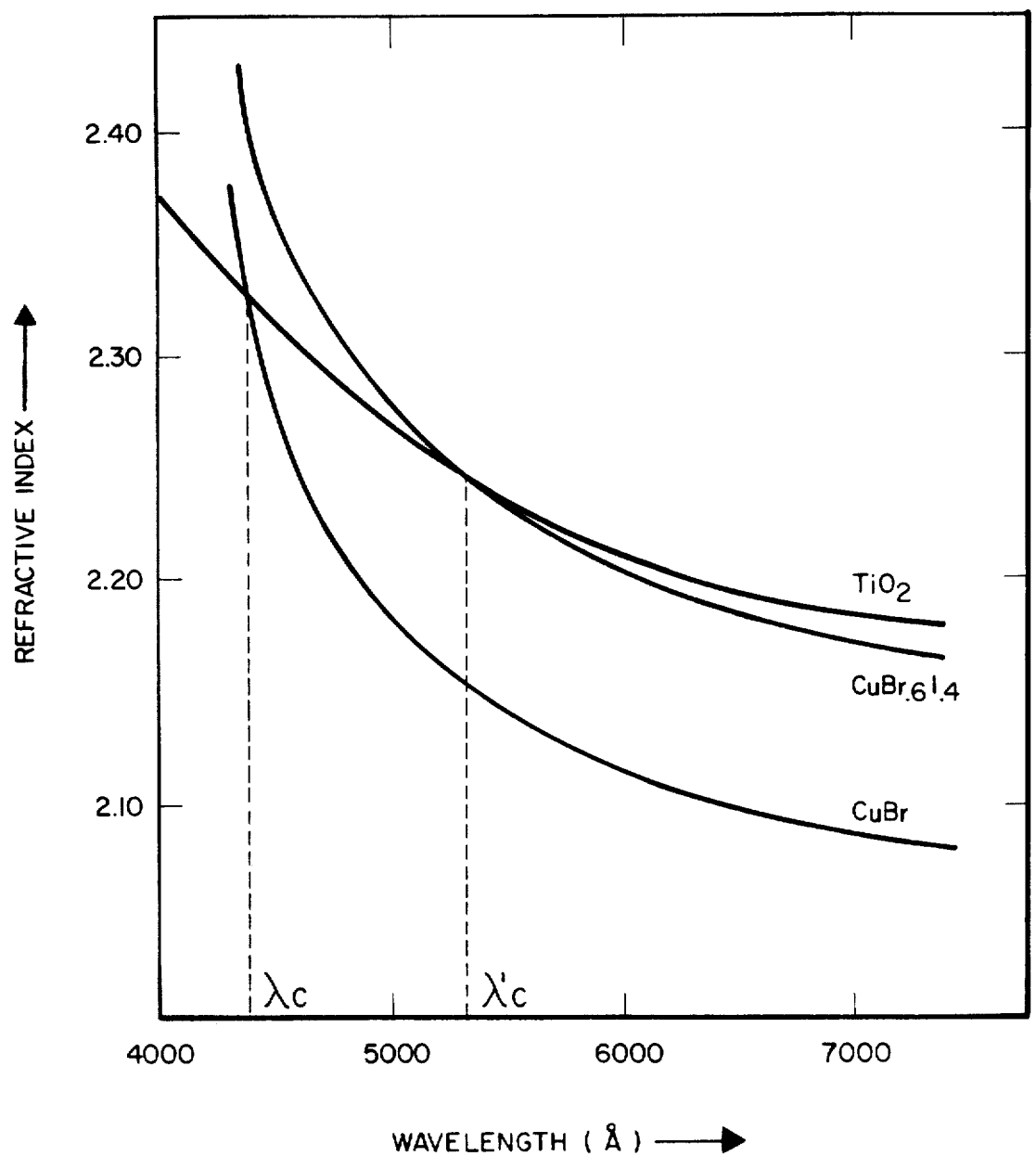
FIG. 4 is a plot of the dispersion curves for $CuBr_{1-x}I_x$ and $TiO_2$.

In order to build a practical Christiansen-Bragg filter according to this invention, the proper combination of thin film materials must be found having a crossing of their dispersion at the desired transmission wavelength $\lambda_c$. There are many instances of such materials, however, in which one of the components is a mixed crystal, such as, for example, $CuBr_{1-x}I_x$. By varying the relative composition of the mixed crystal, the dispersion curve can be shifted to obtain a dispersion crossing at the desired wavelength. FIG. 4, for example, illustrates how the composition of $CuBr_{1-x}I_x$ can be varied to shift the wavelength at which the zero crossing occurs between that material and $TiO_2$.

Most optical materials exhibit a dispersion of approximately $10^{-4}/Å$ or less in the visible part of the spectrum, so that the number of layers in the Christiansen-Bragg filter must be on the order of $10^4$ for a filter with a fractional bandwidth of $10^{-4}$. Furthermore, it is desirable to utilize materials with large dispersion, so the number of layers required for a given out-of-band rejection can be reduced.

In view of the large number of layers involved in a narrowband chirped Christiansen-Bragg filter, it is important to consider the fabrication process for such a filter. The most critical consideration may be the effect of refractive index inhomogeneity in the deposited layers, which could cause a fluctuation of the crossing wavelength across the aperture of the filter, which in turn could broaden the passband and decrease the peak transmission of the filter. Consequently, highly reproducible deposition technology should be used in order to fabricate a large number of optically homogeneous layers. Another consideration is the effect of geometrical errors or defects, such as layer thickness fluctuations and surface roughness. Because the transmission of light through the filter is based on the material dispersion of the layers, however, such errors will affect only the scattering and rejection of out-of-band radiation. Scattering of out-of-band radiation due to surface roughness will decrease the signal-to-noise ratio, while thickness fluctuations can be expected to cause the least perturbation in the transmission properties of the filter.

Although some typical embodiments of the present invention have been illustrated and discussed above, modifications and additional embodiments of the invention will undoubtedly be apparent to those skilled in the art. Various changes, for example, may be made in the configurations, sizes, and arrangements of the components of the invention without departing from the scope of the invention. Furthermore, equivalent elements may be substituted for those illustrated and described herein, parts or connections might be reversed or otherwise interchanged, and certain features of the invention might be utilized independently of the use of other features. Consequently, the examples presented herein, which are provided to teach those skilled in the art how to construct the apparatus and perform the method of this invention, should be considered as illustrative only and not inclusive, the appended claims being more indicative of the full scope of the invention.

What is claimed is:

1. An optical bandpass filter for transmitting light in a narrow band around the wavelength $\lambda_c$, comprising:
   a first series of layers having a refractive index $n_1$; and
   a second series of layers having a refractive index $n_2$ and and alternating with said first series,
   where $n_1$ and $n_2$ have a common value $n_e$ at the wavelength $\lambda_c$ but are different at other wavelengths and
   wherein each succeeding layer in said first series and in said second series is thicker than the preceding layer in said series such that said first and second series further comprise a series of layers of gradually increasing thickness.

2. An optical bandpass filter for transmitting light in a narrowband around the wavelength $\lambda_c$, comprising:
   a first series of layers, each of thickness t, having a refractive index $n_1$; and
   a second series of layers, each of thickness t, having a refractive index $n_2$ and alternating with said first series,
   such that $t = \lambda_c/4n_c$ and $|\Delta| > \pi|D - 1/\lambda_c|$, where $$\Delta = \frac{1}{n_c}\left[\frac{d}{d\lambda}(n_2 - n_1)\right]_{\lambda_c}$$

$$D = \frac{1}{2n_c}\left[\frac{d}{d\lambda}(n_2 + n_1)\right]_{\lambda_c}$$

and where $n_1$ and $n_2$ have a common value $n_c$ at the wavelength $\lambda_c$ but are different at other wavelengths.

3. An optical bandpass filter for transmitting light in a narrow band around the wavelength $\lambda_c$, comprising:
   a first series of layers having a refractive index $n_1$ such that each succeeding layer is thicker than the preceding layer; and
   a second series of layers having a refractive index $n_2$ such that each succeeding layer is thicker than the preceding layer, said layers of said second series alternating with said layers of said first series,
   wherein $n_1$ and $n_2$ have a common value $n_c$ at the wavelength $\lambda_c$ but are different at other wavelengths and
   wherein said first series and said second series each further comprise m layers of thickness $t_i$ ($i = 1, 2, 3 \ldots$ m) such that $t_1 = \lambda_1/4n$ and $t_m = \lambda_2/4n \cos \theta$, where $\lambda_1$ is the minimum wavelength to be reflected by said filter, $\lambda_2$ is the maximum wavelength to be reflected by said filter, $n = (n_1 + n_2)/2$, and $\theta$ is the internal angle corresponding to $\theta_o$, i.e., $\sin \theta_o = n \sin \theta$.

4. The filter of claim 3, wherein the thicknesses of said layers are related by a geometric progression, i.e., $t_{i+1} = kt_i$, where k is a constant.

5. A method of making an optical bandpass filter for transmitting light in a narrow band around the wavelength $\lambda_c$, comprising the steps of:
   selecting a first material having a refractive index $n_1$ and a second material having a refractive index $n_2$ such that $n_1$ is not equal to $n_2$ except at the wavelength $\lambda_c$;
   placing a layer of the first material having a thickness $t = \lambda_c/4n_c$ adjacent to a layer of the second material having a thickness $t = \lambda_c/4n_c$; and
   repeating the step of placing a layer of the first material adjacent to a layer of the second material a plurality of times to form a first series of layers having the refractive index $n_1$ alternating with a second series of layers having the refractive index $n_2$.

6. A method of making an optical bandpass filter for transmitting light in a narrow band around the wavelength $\lambda_c$, comprising the steps of:
   selecting a first material having a refractive index $n_1$ and a second material having a refractive index $n_2$ such that $n_1$ is not equal to $n_2$ except at the wavelength $\lambda_c$;
   placing a layer of the first material adjacent to a layer of the second material;
   repeating the step of placing a layer of the first material adjacent to a layer of the second material a plurality of times to form a first series of layers having the refractive index $n_1$ alternating with a second series of layers having the refractive index $n_2$;

with each succeeding layer in the first series and in the second series thicker than the preceding layer such that the series of layers gradually increase in thickness.

* * * * *